United States Patent
Baik et al.

(10) Patent No.: US 11,323,560 B2
(45) Date of Patent: May 3, 2022

(54) APPARATUS AND METHOD FOR DETECTING ILLEGAL CALL

(71) Applicant: KT Corporation, Seongnam-si (KR)

(72) Inventors: Seong Bok Baik, Daejeon (KR); So Jin Kim, Seoul (KR); Tae-Jin Ahn, Daejeon (KR); Jae Ho Yang, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 17/125,339

(22) Filed: Dec. 17, 2020

(65) Prior Publication Data

US 2021/0105357 A1   Apr. 8, 2021

Related U.S. Application Data

(63) Continuation of application No. PCT/KR2019/002966, filed on Mar. 14, 2019.

(30) Foreign Application Priority Data

Jun. 20, 2018 (KR) .................. 10-2018-0071042
Jul. 26, 2018 (KR) .................. 10-2018-0087377
Nov. 21, 2018 (KR) .................. 10-2018-0144892

(51) Int. Cl.
*H04M 15/00* (2006.01)
*H04M 3/22* (2006.01)

(52) U.S. Cl.
CPC ................................ *H04M 3/2281* (2013.01)

(58) Field of Classification Search
CPC .................................................. H04M 3/2281
(Continued)

(56) References Cited

U.S. PATENT DOCUMENTS 6,163,604 A * 12/2000 Baulier ................. H04M 15/58
379/189
6,377,672 B1 * 4/2002 Busuioc ................. H04M 3/38
379/114.1

(Continued)

FOREIGN PATENT DOCUMENTS

JP   WO 2010125815   * 11/2010 ............. H04L 29/06
KR   10-2009-0079330 A   7/2009
(Continued)

OTHER PUBLICATIONS

International Search Report for PCT/KR2019/002966 dated Jun. 21, 2019 (PCT/ISA/210).
(Continued)

*Primary Examiner* — William J Deane, Jr.
(74) *Attorney, Agent, or Firm* — Sughrue Mion, PLLC

(57) ABSTRACT

An illegal call detection apparatus comprises a data collecting unit, a preprocessing unit, and a learning unit. The data collecting unit collects, from at least one of a subscriber terminal or a call exchanger, a raw packet generated by the subscriber terminal using a VoIP service, and collects, from the billing server, CDR data related to the raw packet. The preprocessing unit generates learning data by using service usage information extracted from the CDR data and service detailed information extracted from the raw packet, and generates a training image by converting the training data into an image according to a predetermined imaging rule. The learning unit extracts at least one or more features from the training image, and learns whether the training image is related to an illegal call by using the features, through an illegal call detection model.

14 Claims, 6 Drawing Sheets

(58) Field of Classification Search
USPC .................... 379/189, 188, 191, 193, 201.01
See application file for complete search history.

(56) References Cited

U.S. PATENT DOCUMENTS

| | | | |
|---|---|---|---|
| 6,412,071 B1* | 6/2002 | Hollander | G06F 12/1441 |
| | | | 726/23 |
| 7,197,560 B2 | 3/2007 | Caslin et al. | |
| 7,266,364 B2* | 9/2007 | Itoh | H04M 3/2281 |
| | | | 455/410 |
| 9,729,727 B1 | 8/2017 | Zhang | |
| 10,554,821 B1* | 2/2020 | Koster | H04L 65/1079 |
| 2014/0328475 A1* | 11/2014 | Cotignola | H04M 1/72502 |
| | | | 379/93.05 |
| 2015/0032449 A1 | 1/2015 | Sainath et al. | |
| 2015/0350438 A1* | 12/2015 | Arslan | G10L 25/93 |
| | | | 379/88.01 |
| 2017/0111506 A1 | 4/2017 | Strong et al. | |
| 2017/0111515 A1* | 4/2017 | Bandyopadhyay | H04M 3/493 |
| 2017/0302784 A1* | 10/2017 | Okamoto | G06F 21/31 |
| 2018/0196873 A1 | 7/2018 | Yerebakan et al. | |
| 2019/0230223 A1* | 7/2019 | Kent | H04M 3/436 |

FOREIGN PATENT DOCUMENTS

| | | |
|---|---|---|
| KR | 10-0978972 B1 | 8/2010 |
| KR | 10-2012-0010372 A | 2/2012 |
| KR | 10-1492733 B1 | 2/2015 |
| KR | 10-1506982 B1 | 3/2015 |
| KR | 10-2016-0141613 A | 12/2016 |

OTHER PUBLICATIONS

Extended European Search Report dated Jan. 31, 2022 from the European Patent Office in EP Application No. 19821679.8.

* cited by examiner

APPARATUS AND METHOD FOR DETECTING ILLEGAL CALL

CROSS-REFERENCE TO RELATED APPLICATION

This application is a continuation of PCT Application No. PCT/KR2019/002966 filed on Mar. 14, 2019, which claims priority to the benefit of Korean Patent Application No. 10-2018-0071042 filed in the Korean Intellectual Property Office on Jun. 20, 2018, Korean Patent Application No. 10-2018-0087377 filed in the Korean Intellectual Property Office on Jul. 26, 2018, and Korean Patent Application No. 10-2018-0144892 filed in the Korean Intellectual Property Office on Nov. 21, 2018, the entire contents of which are incorporated herein by reference.

BACKGROUND

(a) Field

The present invention relates to an apparatus and method for detecting an illegal call.

(b) Description of the Related Art

As Internet usage increases, Voice over Internet Protocol (VoIP) such as Internet phone, VoLTE, or mobile VoIP are rapidly spreading, and various types of Internet phone such as an enterprise IP-PBX, a CALL BOX, or a softphone also have been distributed.

However, since the Internet phone accesses the Internet, the Internet phone is vulnerable to security. Particularly, there are many cases that the enterprise IP-PBXs purchased by customers in person, may use an ID and a password configured in a factory without changing them. Or the ID and the password can be found easily with a simple program. Accordingly, due to illegal calls induced by stealing IDs and passwords used for the Internet phone, customers may be damaged by charges ranging from thousands to tens of thousands dollars per month.

SUMMARY

The present invention provides technology to detect illegal calls by learning a generated illegal call pattern through a CNN algorithm and to block the illegal calls.

An illegal call detection apparatus according to an embodiment of the present invention comprises: a data collecting unit that collects, from at least one of a subscriber terminal or a call exchanger, a raw packet generated by a subscriber terminal using a Voice over Internet Protocol (VoIP) service and collects, from a billing server, call detailed record (CDR) data related to the raw packet; a preprocessing unit that generates training data by using service usage information extracted from the CDR data and service detailed information extracted from the raw packet, and generates a training image by converting the training data into an image according to a predetermined imaging rule; and a learning unit that extracts at least one or more features from the training image and learns whether the training image is related to an illegal call by using the features, through an illegal call detection model.

The service usage information includes at least one of detection time information, calling number information, or receiving number information, and the service detailed information includes at least one of receiving country information, source IP information, IP country information, and terminal identifier information.

The preprocessing unit generates the training data by sequentially arranging in a table in the order of information included in the service usage information and information included in the service detailed information.

The preprocessing unit generates unit polygons, each of which visualizes the information based on a byte size of the information arranged in the table, and generates the training image by arranging the unit polygons in the order arranged in the table.

The unit polygons include a rectangle having a length proportional to a byte size of each of the information as a length of two sides facing each other, and the unit polygons are vertically arranged to be staggered in the training image according to the order arranged in the table.

The illegal call detection apparatus further comprises an illegal call detection unit that determines whether a new target image is related to an illegal call by inputting the new target image into the illegal call detection model when the new target image is generated.

The illegal call detection apparatus further comprises an action unit that blocks a subscriber terminal related to the new target image when the new target image is related to the illegal call.

A method for training an illegal call detection model by an illegal call detection apparatus according to an embodiment of the present invention comprises collecting a raw packet generated by a previously detected illegal call from at least one of a subscriber terminal related to the illegal call or a call exchanger, and collecting CDR data related to the raw packet from a billing server; extracting service usage information from the CDR data, and extracting service detailed information from the raw packet; determining an illegal call pattern information by using information included in the service usage information and in the service detailed information; generating training data by using the service usage information, the service detailed information, and the illegal call pattern information; generating a training image by converting the training data into an image according to a predetermined imaging rule; and learning that the training image is related to the illegal call through the illegal call detection model.

The service usage information includes at least one of detection time information, calling number information, or receiving number information, the service detailed information includes at least one of receiving country information, source IP information, IP country information, and a terminal identifier information, and the illegal call pattern information includes at least one of cumulative transmitting call count information or cumulative receiving call count information.

Determining the illegal call pattern information comprises determining cumulative transmitting call count information originated from the subscriber terminal by using calling number information included in the service usage information, determining cumulative receiving call count information received by the subscriber terminal during a threshold time by using the receiving number information included in the service usage information, and tagging at least one of the cumulative transmitting call count information.

Generating the training data comprises generating the training data by sequentially arranging in a table in the order of information included in the service usage information, information included in the service detailed information, and information included in the illegal call pattern information.

Generating the training image comprises generating unit polygons, each of which visualizes the information arranged in the table based on a byte size of the information arranged in the table, and generating the training image by arranging the unit polygons in the order arranged in the table.

The unit polygons include rectangular shapes having a length proportional to the byte size of information arranged in the table as lengths of both sides facing each other, and the unit polygons are sequentially arranged in a vertical direction so as to be staggered on the training image.

A method for training an illegal call detection model by an illegal call detection apparatus according to an embodiment of the present invention further comprises, when a new target image is generated, determining whether the training image is related to an illegal call by inputting the new target image into an illegal call detection model, and blocking a subscriber terminal related to the new target image when the new target image is related to the illegal call.

According to the present invention, by detecting and blocking illegal calls in real time, it is possible to prevent fundamentally billing damage caused by illegal calls.

DETAILED DESCRIPTION

Figure 1:
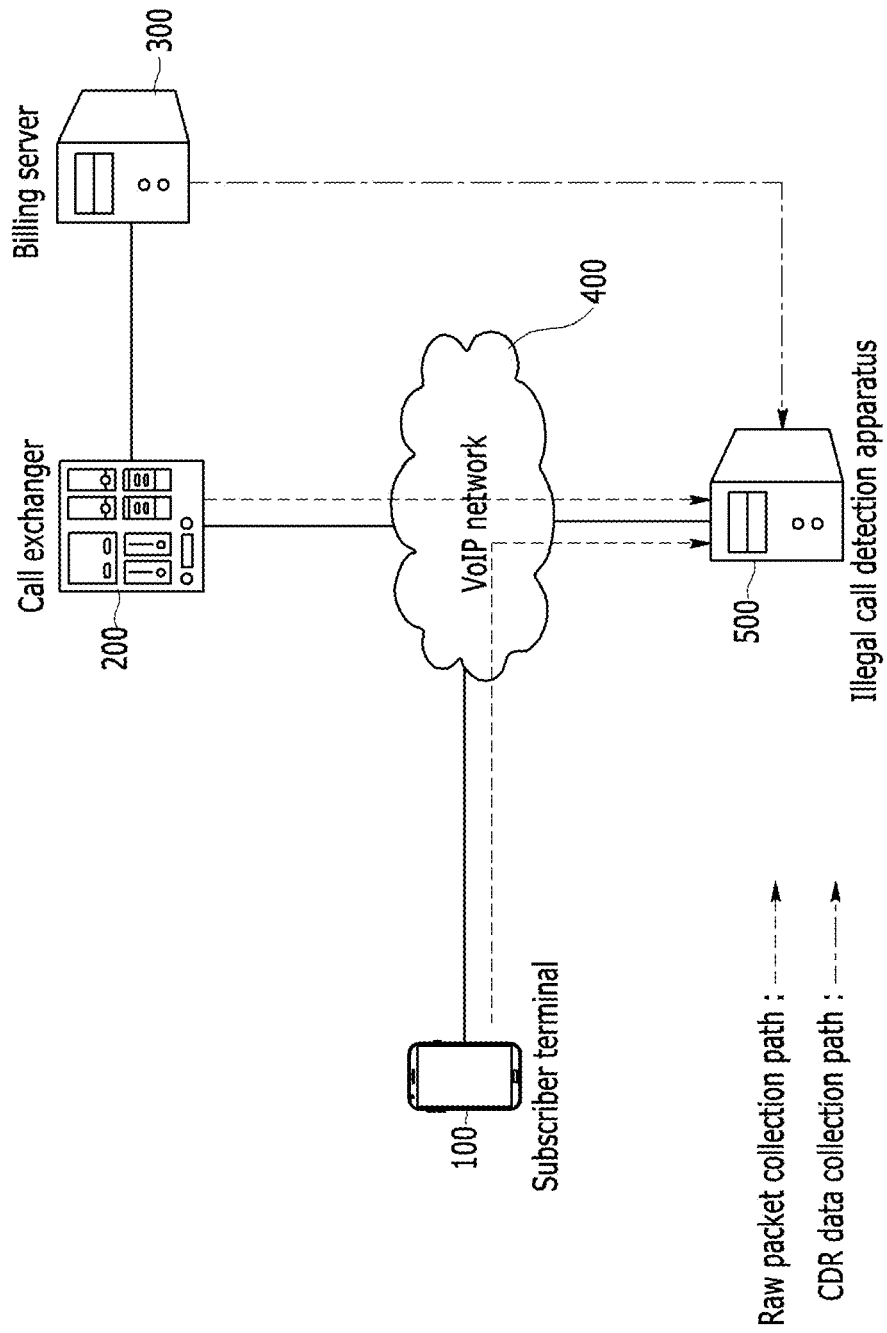
FIG. 1 is a diagram illustrating an environment in which an illegal call detection apparatus according to an embodiment of the present invention is implemented.

In the following detailed description, exemplary embodiments of the present invention will be described in detail with reference to the accompanying drawings so that those of ordinary skill in the art may easily implement the present invention. However, the present invention may be implemented in various different ways and is not limited thereto. Then, in the drawings, elements irrelevant to the explanation of the present invention are omitted for simplicity of explanation, and like reference numerals designate like elements throughout the specification.

Throughout the specification, when a part is referred to "include" a certain element, it means that it may further include other elements rather than exclude other elements, unless specifically indicates otherwise. In addition, the terms "-er", "-or", and "module" described in the specification mean units for processing at least one function and operation, and can be implemented by software, hardware, or a combination thereof FIG. 1 is a diagram illustrating an environment in which an illegal call detection apparatus according to an embodiment of the present invention is implemented.

Referring to FIG. 1, a subscriber terminal 100 generates raw packets depending on using a Voice over Internet Protocol (VoIP) service.

Specifically, the subscriber terminal 100 is an Internet phone terminal, and provides internet phone service for subscriber having subscribed to the VoIP service.

The subscriber terminal 100 may include a VoIP terminal, and may be a physical VoIP terminal device such as a SoIP phone, an IP-PBX or a call box, or may be a softphone operated by software on a PC or a mobile device. In addition, the subscriber terminal 100 include a terminal for using the VoIP service via a VoIP network 400.

When the subscriber terminal 100 uses the VoIP service, the subscriber terminal 100 transmits a raw packet including a call connection request to a call exchanger 200 via the VoIP network 400.

Upon receiving the raw packet from the subscriber terminal 100, the call exchanger 200 transmits a call connection request signal to a receiving terminal (not shown) corresponding to the call connection request included in the raw packet.

The call exchanger 200 is located in a VoIP service provider network and interworks with a billing server 300. The call exchanger 200 transmits information on VoIP service usage of the subscriber terminal 100 to a billing server 300.

The billing server 300 generates call detail record (CDR) data for the subscriber terminal 100 by using the information received from the call exchanger 200.

Meanwhile, the billing server 300 can generate the CDR data for the subscriber terminal 100, even when the subscriber terminal 100 uses a specific VoIP service (e.g., IP-centrex or calls free calls (CFC)).

The VoIP network 400 may be a general Internet network that connects the subscriber terminal 100 with the call exchanger 200 and makes it possible to transmit and receive data for providing the subscriber terminal 100 with the VoIP service.

An illegal call detection apparatus 500 collects raw packets from at least one of the subscriber terminal 100 or the call exchanger 200, collects the CDR data from the billing server 300, generates a training image using the raw packets and the CDR data, detects an illegal call by learning the training image through an illegal call detection model, and blocks the detected illegal call. Hereinafter, the illegal call detection apparatus 500 will be described in detail.

Figure 2:
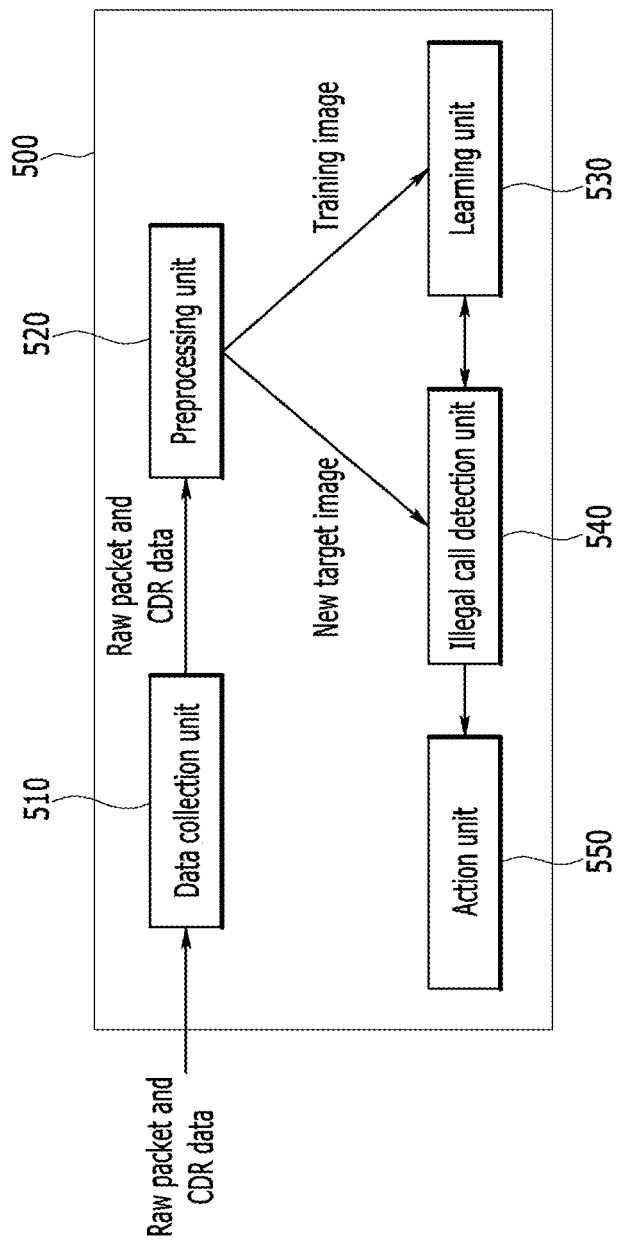
FIG. 2 is a diagram for explaining an illegal call detection apparatus according to an embodiment of the present invention.
Figure 3:
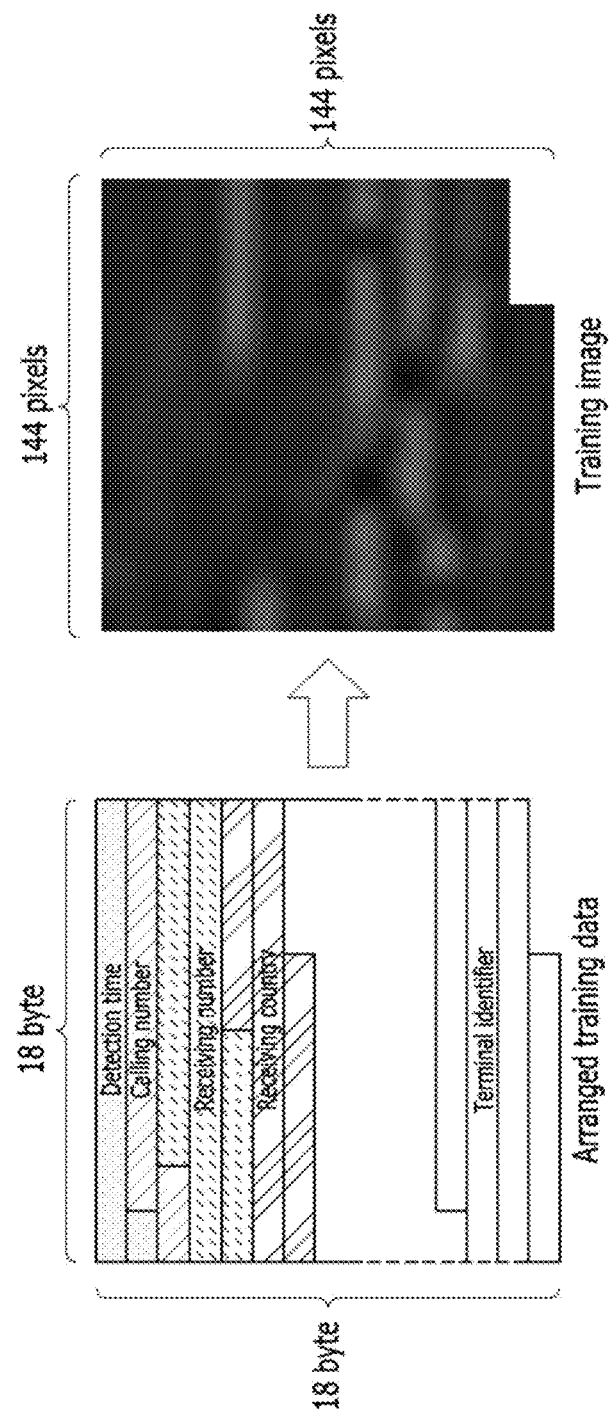
FIG. 3 is a diagram for explaining a method of generating a training image by a preprocessing unit.
Figure 4:
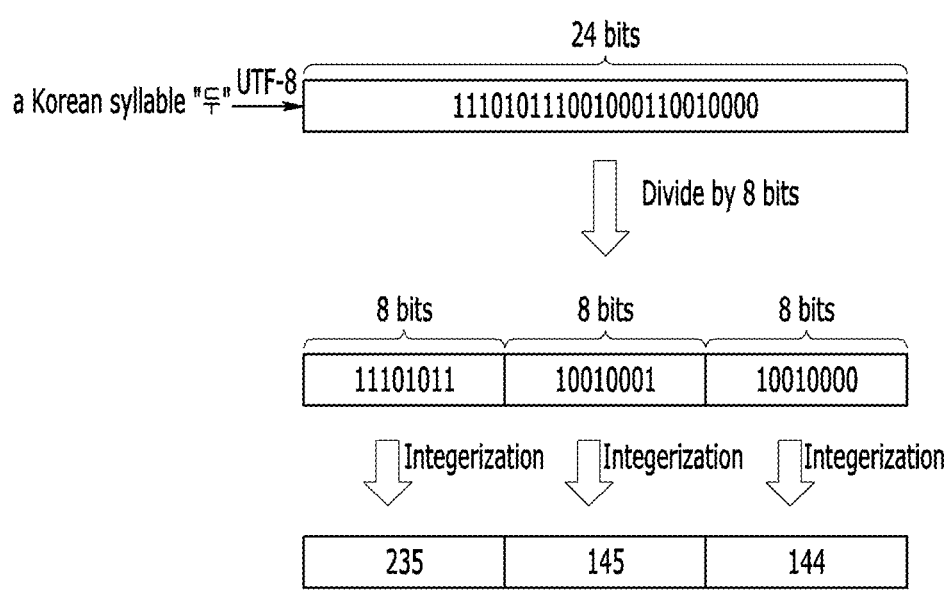
FIG. 4 is a diagram for explaining a method of integerizing contents included in each of unit rectangles by a preprocessing unit.
Figure 5:
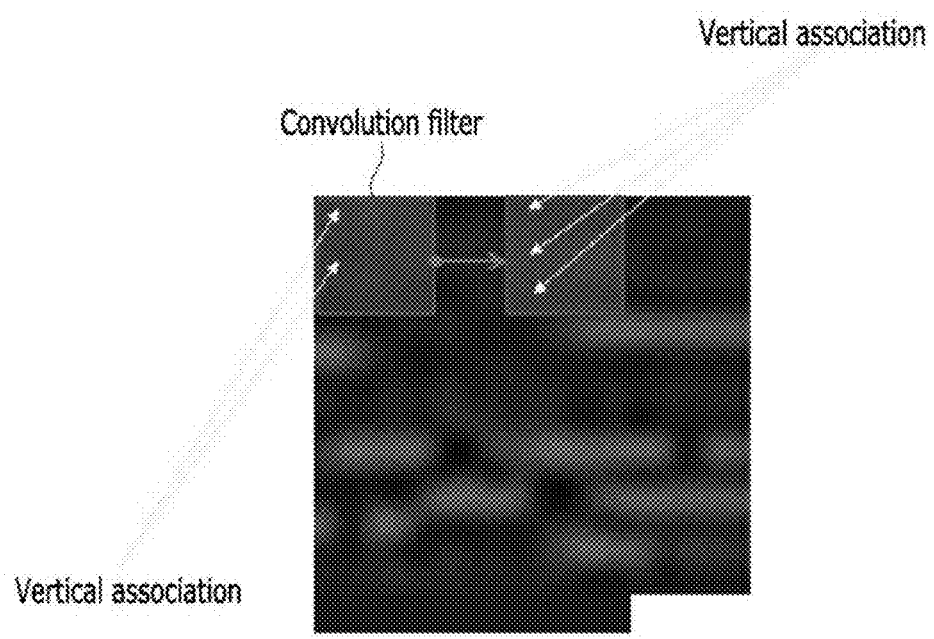
FIG. 5 is a diagram for explaining a method of learning a training image by a learning unit through a convolution filter.

FIG. 2 is a diagram for explaining an illegal call detection apparatus according to an embodiment of the present invention, FIG. 3 is a diagram for explaining a method of generating a training image by a preprocessing unit, FIG. 4 is a diagram for explaining a method of integerizing contents included in each of unit rectangles by a preprocessing unit, and FIG. 5 is a diagram for explaining a method of learning a training image by a learning unit through a convolution filter.

Referring to FIG. 2, an illegal call detection apparatus 500 includes a data collection unit 510, a preprocessing unit 520, a learning unit 530, an illegal call detection unit 540, and an action unit 550.

The data collection unit 510 collects a raw packet generated by a subscriber terminal 100 using a Voice over Internet Protocol (VoIP) service, from at least one of the subscriber terminal 100 or a call exchanger 200.

Specifically, when the VoIP service is processed via a session initiation protocol (SIP) protocol or integrated services digital network (ISDN) user part (ISUP) protocol, the subscriber terminal 100 generates a raw packet containing various signal information. The data collecting unit 510 receives the generated raw packet. Table 1 shows field information of an exemplary raw packet generated based on the SIP protocol.

TABLE 1

| INVITE SIP/2.0 |
| --- |
| Call-id |
| Via |
| From |
| To |

In addition, the data collection unit 510 collects call detail record (CDR) data related to the raw packet generated by the subscriber terminal 100 from the billing server 300. The CDR data includes information on charging data incurred from the VoIP service usage of the subscriber terminal 100. Specifically, the CDR data includes calling number information, receiving number information, call start time information, and call duration. The preprocessing unit 520 generates training data by using service usage information extracted from the CDR data and service detailed information extracted from the raw packet.

Specifically, the preprocessing unit 520 determines detection time information using the time at which the CDR data is collected, and generates service usage information by extracting at least one of the calling number information or the receiving number information included in the CDR data. That is, the service usage information includes at least one of the detection time information, the calling number information, or the receiving number information.

In addition, the preprocessing unit 520 determines at least one of receiving country information, source IP information, IP country information, and an terminal identifier by using information included in the raw data, and generates the service detailed information. That is, the service detailed information includes at least one of the receiving country information, the source IP information, the IP country information, and the terminal identifier.

The preprocessing unit 520 generates training data by sequentially arranging in a table in the order of information included in service usage information and information included in service detailed information.

Specifically, the preprocessing unit 520 generates the training data by sequentially arranging in a table in the order of the detection time information, the calling number information, the receiving number information, the receiving country information, the source IP information, the IP country information, and the terminal identifier information. Table 2 shows an example of training data, and the training data shown in Table 2 may include a total of 244 bytes.

The preprocessing unit 520 converts the generated training data into an image according to a predetermined imaging rule to generate a training image. Referring to FIG. 3, the preprocessing unit 520 generates unit polygons, each of which visualizes information based on a byte size of information arranged in a table, and then generates a training image by arranging the unit polygons according to the order arranged in the table. In this case, the unit polygons consist of a rectangle having a length proportional to the byte size of each of the information as the length of both sides facing each other, and are sequentially arranged in a vertical direction so as to be staggered on the training image.

For example, as shown in FIG. 3, the preprocessing unit 520 may generate a unit rectangle having the same vertical length for each of the information of Table 2. Here, the vertical length of the unit rectangle may be one byte.

Meanwhile, the preprocessing unit 520 determines information having the smallest byte size in the training data, and determines a polygon so as to have a side length of a byte size smaller than the byte size of the corresponding information. Thereafter, the preprocessing unit 520 sequentially arranges unit rectangles inside a shape of the determined polygon.

For example, since the smallest byte size among the information of Table 2 is 20 bytes, the preprocessing unit 520 determines a polygon with a horizontal length of 18 bytes smaller than 20 bytes, and may sequentially arrange unit rectangles for each of the information from the detection time information to the terminal identifier information, inside the polygon.

In this case, 18 bytes among the 20 bytes of the detection time information are marked in the first row, and the remaining 2 bytes are marked in the second row. In addition, 16 bytes among the 20 bytes of the calling number information are marked in the second row, and the remaining 2 bytes are marked in the third row. Arranging unit rectangles sequentially in this way allows the unit rectangles to be staggered within the entire polygon.

The preprocessing unit 520 integerizes contents included in each of the unit rectangles.

Specifically, the preprocessing unit 520 divides the contents that are inputted in a bit format into each of the unit rectangles, into a predetermined bit unit, and integerizes the divided bit units.

For example, referring to FIG. 4, when syllables are input in Unicode Transformation Format-8bit (UFT-8) format, a Korean syllable 두 included in an arbitrary unit rectangle consists of a total of 24 bits of "111010111001000110010000". The Korean syllable 두 is pronounced "DO" in English. In this case, the preprocessing unit 520 divides "111010111001000110010000" into 8-bit units to generate "11101011", "10010001" and "10010000", and may integerize each of the divided bit units. The integerized results correspond to "235", "145" and "144".

The preprocessing unit 520 generates a training image by imaging entire polygons in which unit rectangles are arranged to be staggered, by using an imaging algorithm. For example, when a polygon having one side with a length

TABLE 2

| Detection time | Calling number | Receiving number | Receiving country | Source IP | IP country | Terminal identifier |
| --- | --- | --- | --- | --- | --- | --- |
| 20 bytes | 20 bytes | 40 bytes | 40 bytes | 20 bytes | 40 bytes | 64 bytes |
| 2018/10/15/14:00 | 010-2139-1230 | 02-529-0219 | KR | 110.111.111 | KR | 1wk12 | of 18 bytes is imaged in FIG. 3, a training image which has the same polygonal shape having one side with length of 144 pixels may be generated.

The learning unit 530 extracts at least one feature from the training image, and learns whether the training image is related to an illegal call by using the features, through an illegal call detection model.

Specifically, the learning unit 530 uses the illegal call detection model that classifies whether the training image is related to an illegal call or a normal call through a CNN algorithm.

The illegal call detection model includes one or more convolution layers in a neural network. The learning unit 530 extracts features of the training image through convolution filters of the convolution layers and classifies whether the training image is related to an illegal call or a normal call by applying the extracted features to the neural network.

For example, referring to FIG. 5, the learning unit 530 may extract features by applying a convolution filter with a size of 3×3 to the training image shown in FIG. 3. In this case, since each of the information is arranged alternately in the training image shown in FIG. 3, features of plural information can be extracted simultaneously.

Specifically, in FIG. 5, the learning unit 530 may learn by extracting a feature of the vertical association between the detection time information at the time of initial filtering and the calling number information. Thereafter, as the convolution filter moves, the learning unit 530 may learn by extracting features of the vertical association among three types of information of the detection time information, the calling number information, and the receiving number information.

Meanwhile, an administrator determines a classification accuracy by inputting a training image related to an illegal call or a training image related to a normal call into the illegal call detection model, and may train the illegal call detection model until the classification accuracy comes to the same as or higher than a predetermined threshold accuracy.

When a new target image is generated, the illegal call detection unit 540 inputs the new target image into the illegal call detection model to determine whether the new target image is related to an illegal call. The new target image may be generated from raw packets and CDR data of a new target subscriber, and be made by a same method with the training image for the illegal call detection model.

If the new target image is related to an illegal call, the action unit 550 blocks the new target subscriber terminal related to the new target image.

Specifically, if the new target image is related to an illegal call, the action unit 550 identifies new target data related to the new target image.

Thereafter, the action unit 550 determines a call which is related to calling number information, receiving number information, receiving country information, or terminal identification information included in the new target data, and blocks the determined call or provides a voice notifying that the call cannot be connected through an announcement.

Figure 6:
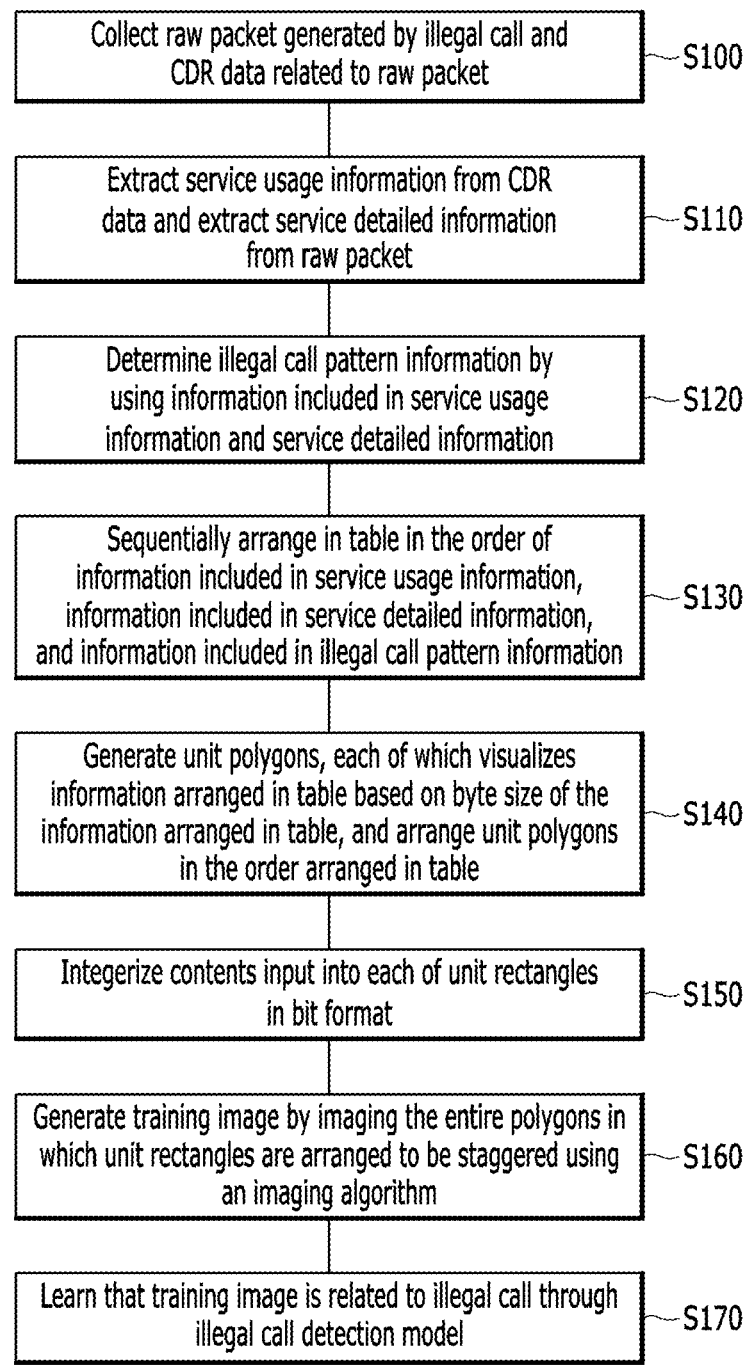
FIG. 6 is a diagram for explaining a method of training an illegal call detection model by an illegal call detection apparatus.

FIG. 6 is a diagram for explaining a method of training an illegal call detection model by an illegal call detection apparatus.

In FIG. 6, the same statements as described with reference to FIG. 1 to FIG. 5 will be omitted.

Referring to FIG. 6, an illegal call detection apparatus 500 collects a raw packet generated by a previously detected illegal call from at least one of a subscriber terminal related to the illegal call or a call exchanger, and collects CDR data related to the raw packet from a billing server (S100).

The illegal call detection apparatus 500 extracts service usage information from the CDR data and extracts service detailed information from the raw packet (S110).

The illegal call detection apparatus 500 determines illegal call pattern information by using the information included in the service usage information and the service detailed information (S120).

Specifically, the illegal call detection apparatus 500 generates cumulative call count information based on calling number information and receiving number information included in service usage information. In this case, the cumulative call count information includes cumulative transmitting call count information and cumulative receiving call count information.

The illegal call detection apparatus 500 counts the number of calls originated from a subscriber terminal 100 during a threshold time and determines the cumulative transmitting call count information. For example, the illegal call detection apparatus 500 may determine the cumulative transmitting call count information by counting the number of calls originated from the subscriber terminal 100 during 1 minute, 3 minutes, and 60 minutes. Here, the threshold time may be set in advance or may be set dynamically.

In addition, the illegal call detection apparatus 500 determines cumulative receiving call count information by counting the number of calls received by the subscriber terminal 100 during the threshold time. For example, the illegal call detection apparatus 500 may determine the cumulative receiving call count information by using the number of calls received by the subscriber terminal 100 during 1 minute, 3 minutes, and 60 minutes. Here, the threshold time may be set in advance or may be set dynamically.

The illegal call detection apparatus 500 tags illegal call pattern information including at least one of the cumulative transmitting call count information or the cumulative receiving call count information, as being related to an illegal call.

Specifically, since the collected raw data and CDR data are generated by the illegal call, the illegal call detection apparatus 500 tags the determined information as being related to the illegal call.

The illegal call detection apparatus 500 generates training data by using the service usage information, the service detailed information, and the illegal call pattern information.

Specifically, the illegal call detection apparatus 500 generates the training data by sequentially arranging in a table in the order of information included in the service usage information, information included in the service detailed information, and information included in the illegal call pattern information (S130).

For example, the illegal call detection apparatus 500 may generate the training data by sequentially arranging in a table in the order of detection time information, calling number information, receiving number information, receiving country information, source IP information, IP country information, terminal identifier information, cumulative transmitting call count information, and cumulative receiving call count information.

The illegal call detection apparatus 500 generates a training image by converting the training data into an image according to a predetermined imaging rule.

Specifically, the illegal call detection apparatus 500 generates unit polygons, each of which visualizes information arranged in the table based on the byte size of the information arranged in the table, and arranges the generated unit polygons in the order arranged in the table (S140).

The illegal call detection apparatus 500 divides contents which are input in the bit format into each of unit rectangles, into predetermined bit units, and integerizes the divided bit units (S150).

The illegal call detection apparatus 500 generates a training image by imaging the entire polygons in which unit rectangles are arranged to be staggered using an imaging algorithm (S160).

Through the illegal call detection model, the illegal call detection apparatus 500 learns that the training image is related to an illegal call (S170). In this case, the generated training image includes the illegal call pattern information including at least one of the cumulative transmitting call count information or the cumulative receiving call count information in addition to the service usage information and the service detailed information, so a pattern related to illegal calls collected during the threshold time may be learned additionally.

Thereafter, when a new target image is generated, the illegal call detection apparatus 500 determines whether the new target image is related to the illegal call by inputting the new target image into the illegal call detection model. When the new target image is related to the illegal call, the illegal call detection apparatus 500 may block a subscriber terminal related to the new target image.

According to the present invention, by detecting and blocking illegal calls in real time, it is possible to fundamentally prevent billing damage caused by illegal calls.

What is claimed is:

1. An illegal call detection apparatus comprising:
   a data collecting unit that collects, from at least one of a subscriber terminal or a call exchanger, a raw packet generated by the subscriber terminal using a Voice over Internet Protocol (VoIP) service and collects, from a billing server, call detailed record (CDR) data related to the raw packet;
   a preprocessing unit that generates training data by using service usage information extracted from the CDR data and service detailed information extracted from the raw packet, and generates a training image by converting the training data into an image according to a predetermined imaging rule; and
   a learning unit that extracts at least one or more features from the training image and learns whether the training image is related to an illegal call by using the features, through an illegal call detection model.

2. The illegal call detection apparatus of claim 1, wherein the service usage information includes at least one of detection time information, calling number information, or receiving number information, and
   wherein the service detailed information includes at least one of receiving country information, source IP information, IP country information, and terminal identifier information.

3. The illegal call detection apparatus of claim 1, wherein the preprocessing unit generates the training data by sequentially arranging in a table in the order of information included in the service usage information and information included in the service detailed information.

4. The illegal call detection apparatus of claim 3, wherein the preprocessing unit generates unit polygons, each of which visualizes the information based on a byte size of the information arranged in the table, and generates the training image by arranging the unit polygons in the order arranged in the table.

5. The illegal call detection apparatus of claim 4, wherein the unit polygons include a rectangle having a length proportional to a byte size of each of the information as a length of two sides facing each other, and the unit polygons are vertically arranged to be staggered in the training image according to the order arranged in the table.

6. The illegal call detection apparatus of claim 1, further comprising
   an illegal call detection unit that determines whether a new target image is related to an illegal call by inputting the new target image into the illegal call detection model when the new target image is generated.

7. The illegal call detection apparatus of claim 6, further comprising
   an action unit that blocks a subscriber terminal related to the new target image when the new target image is related to the illegal call.

8. A method of training an illegal call detection model by an illegal call detection apparatus, the method comprising:
   collecting a raw packet generated by a previously detected illegal call from at least one of a subscriber terminal related to the illegal call or a call exchanger, and collecting CDR data related to the raw packet from a billing server;
   extracting service usage information from the CDR data, and extracting service detailed information from the raw packet;
   determining an illegal call pattern information by using information included in the service usage information and in the service detailed information;
   generating training data by using the service usage information, the service detailed information, and the illegal call pattern information;
   generating a training image by converting the training data into an image according to a predetermined imaging rule; and
   learning that the training image is related to the illegal call through the illegal call detection model.

9. The method of claim 8, wherein the service usage information includes at least one of detection time information, calling number information, or receiving number information,
   wherein the service detailed information includes at least one of receiving country information, source IP information, IP country information, and a terminal identifier information, and
   wherein the illegal call pattern information includes at least one of cumulative transmitting call count information or cumulative receiving call count information.

10. The method of claim 8, wherein determining the illegal call pattern information comprises
    determining cumulative transmitting call count information originated from the subscriber terminal by using calling number information included in the service usage information,
    determining cumulative receiving call count information received by the subscriber terminal during a threshold time by using the receiving number information included in the service usage information, and
    tagging at least one of the cumulative transmitting call count information or the cumulative receiving call count information, as related to an illegal call.

11. The method of claim 8, wherein generating the training data comprises generating the training data by sequentially arranging in a table in the order of information included in the service usage information, information included in the service detailed information, and information included in the illegal call pattern information.

12. The method of claim 11, wherein generating the training image comprises
- generating unit polygons, each of which visualizes the information arranged in the table based on a byte size of the information arranged in the table, and
- generating the training image by arranging the unit polygons in the order arranged in the table.

13. The method of claim 12, wherein the unit polygons include rectangular shapes having a length proportional to the byte size of information arranged in the table as lengths of both sides facing each other, and the unit polygons are sequentially arranged in a vertical direction so as to be staggered on the training image.

14. The method of claim 8, further comprising:
- when a new target image is generated, determining whether the training image is related to an illegal call by inputting the new target image into an illegal call detection model; and
- blocking a subscriber terminal related to the new target image when the new target image is related to the illegal call.

* * * * *